US006474119B1

(12) United States Patent

Halvorson et al.

(10) Patent No.: US 6,474,119 B1

(45) Date of Patent: Nov. 5, 2002

(54) POP-UP HANDLE ASSEMBLY

(75) Inventors: Edward M. Halvorson, Elkhart, IN (US); Bruce A. Bennett, Granger, IN (US)

(73) Assignee: Fastec Industrial Corp., Elkhart, IN (US)

(*) Notice: Subject to any disclaimer, the term of this patent is extended or adjusted under 35 U.S.C. 154(b) by 123 days.

(21) Appl. No.: 09/238,410

(22) Filed: Jan. 28, 1999

(51) Int. Cl.[7] ............................................ B60R 25/02

(52) U.S. Cl. ..................................... 70/208; 292/336.3

(58) Field of Search .......................... 70/208, 210, 224, 70/DIG. 20, DIG. 27, DIG. 31; 292/57, 62, 67, 69, 336.3, DIG. 31, DIG. 37

(56) References Cited

U.S. PATENT DOCUMENTS

| | | | | | |
|---|---|---|---|---|---|
| 2,117,943 | A | * | 5/1938 | Clinker | 70/208 |
| 3,735,613 | A | * | 5/1973 | Diebel et al. | 70/208 |
| 3,834,198 | A | * | 9/1974 | Wiczer | 70/208 |
| 4,687,236 | A | * | 8/1987 | Rasche | |
| 5,099,664 | A | * | 3/1992 | Wen-Yin | |
| 5,813,257 | A | * | 9/1998 | Claghorn et al. | 70/208 |

FOREIGN PATENT DOCUMENTS

| | | | | |
|---|---|---|---|---|
| CA | 472392 | * | 3/1951 | 70/208 |
| DE | 834816 | * | 7/1949 | 70/208 |
| GB | 453333 | * | 9/1936 | 70/208 |
| GB | 596473 | * | 1/1948 | 70/208 |

* cited by examiner

*Primary Examiner*—Suzanne Dino Barrett

(74) *Attorney, Agent, or Firm*—Dykema Gossett PLLC

(57) ABSTRACT

A pop-up handle assembly includes a planar mounting panel which may be integral with a housing. The assembly also includes dual longitudinal bores generally parallel to one another and offset from each other. A handle that rotationally drives an interconnected shaft is carried by one of the bores to operate between locked and open positions. When in locked position, the handle is prevented from being rotated. When in open position, the handle extends outwardly from the housing and can rotate approximately 90 degrees to thereby drivingly rotate the shaft, which allows access to an enclosed space. A lock cylinder is carried by the other bore and rotates therein between locked and unlocked positions. When in locked position, the cylinder is not depressible. When in the unlocked position, the cylinder functions as a depressible push button which engages a retainer member to release the handle from locked position.

18 Claims, 3 Drawing Sheets

POP-UP HANDLE ASSEMBLY

BACKGROUND OF THE INVENTION

The present invention is directed to pop-up handle assemblies mounted to a member used to access a closed space such as a tonneau cover of a pick-up truck, and in particular to an assembly having a housing with dual longitudinal bores therein, one for carrying a pop-up handle and the other for carrying a depressible keylock cylinder.

This invention provides an improvement over the pop-up handle assembly of U.S. Pat. No. 4,689,976 to Larsen [hereinafter "'976 patent"], the disclosure of which is hereby incorporated by reference. The '976 patent discloses a depressible key-plug that is mounted in a T-handle. A key is inserted to unlock the key-plug, thus allowing it to function as a depressible button. Upon depression of the button, the T-handle pops to an open position. In the open position, the T-handle is rotated in order to drivingly rotate a drive-bar which controls the position of a latch.

One problem with this key-plug is that both the cam slide and lock pin 50 shift with the pop-open movement of the handle. Over time, the tiny catch portion of the lock pin will wear out with this movement. Another problem is that when the handle as well as its lock pin and stop pin 52 are shifted outwardly to the position in FIG. 2C of the '976 patent under the action of spring 58, there is a tendency for tiny spring 68 to become dislodged after repeated abrupt outward extensions of the handle. Furthermore, during cold weather conditions, sticking or freezing up of the lock cylinder could impede the entire operation of the handle assembly. Finally, the mounting panel, being generally rectangular in shape, is suitable for rigidly mounting the assembly only onto flat surfaces and not onto contoured surfaces.

SUMMARY OF THE INVENTION

It is an object of the present invention to avoid the disadvantages of the prior art by relocating the lock cylinder in the housing away from the pop-up handle.

In particular, the pop-up handle assembly includes a mounting panel that is generally T-shaped because this configuration is especially advantageous for rigidly attaching the assembly on support surfaces that are contoured. A housing is supported by the mounting panel. A sleeve is rotatably supported within the housing and includes a first bore therein. A shaft is drivingly connected to the sleeve. A pop-up handle is movable longitudinally between locked and open positions relative to the sleeve. Furthermore, a driving connection established between the sleeve and the handle permits the handle to move longitudinally within the first bore while maintaining a rotatable driving connection between the sleeve and the handle. The handle and the mounting panel include interengagable portions which prevent rotation of the handle when in locked position. Spring means biases the handle towards open position.

The housing also includes a second bore therein. A depressible lock cylinder is slidably and rotatably disposed within the second bore. By having these dual bores disposed along generally parallel longitudinal axes and offset laterally from one another, movement of the handle occurs within one bore while operation of the lock cylinder occurs in the other bore. This configuration is advantageous because the pop-open movement of the handle no longer causes wear-and-tear upon retaining components as in the prior art. Since the lock cylinder of the present invention is supported within a different bore than the handle, the lock cylinder is provided with its own separate return spring which avoids any sticking or freezing up of the lock cylinder.

Retaining means are provided to keep the handle in locked position and to prevent the spring from urging the handle toward open position. Additionally, means are provided for operating the retaining means upon depression of the lock cylinder for releasing the retaining means and for permitting the handle to move to open position under the influence of the spring means. This includes cam surfaces and biasing springs. Since this configuration is no longer carried by the handle, the present invention specifically avoids dislodgement of springs as in the prior art due to repeated abrupt outward movement of the handle. Instead, the cam surfaces and biasing springs do not move outwardly with the handle during the pop-up shifting movement of the handle.

Other objects and advantages will be apparent from the drawings and specification which follows.

DETAILED DESCRIPTION OF THE INVENTION

Figure 1:
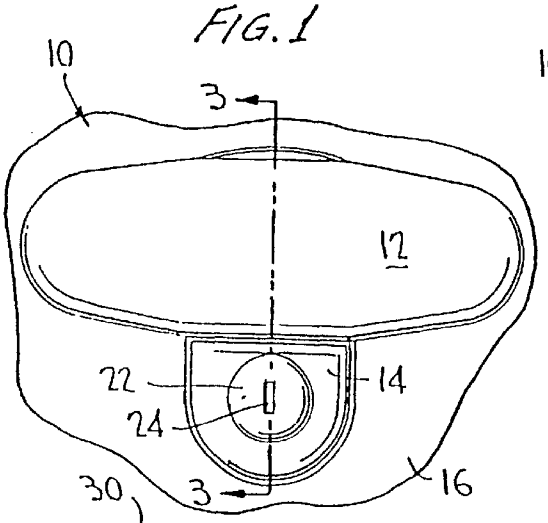
FIG. 1 is a front view of the pop-up handle assembly in locked position.
Figure 2:
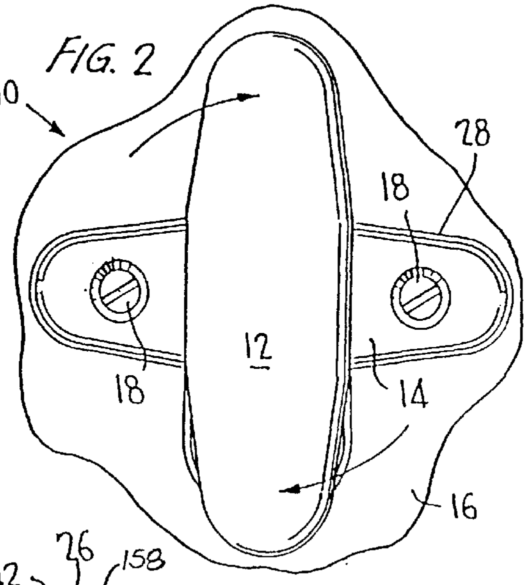
FIG. 2 is a front view of the pop-up handle assembly in open position with the handle rotated about 90 degrees from the position shown in FIG. 1.

The present invention will now be described in greater detail with reference to the accompanying drawings. Referring to FIGS. 1 and 2, a pop-up handle assembly 10 includes a pop-up handle 12 that is rotatable with respect to a generally planar mounting panel 14. Panel 14 is positioned against a support surface 16 which may be the surface of a door for a garage, of a deck, or of a tonneau cover for a pick-up truck, for example. The mounting panel 14 includes several mounting holes 18 for inserting screws or other types of fasteners to secure the mounting panel to the support surface. Conventionally, these mounting holes are dimensioned to be 2.750 inches on center. The body of the mounting panel is generally T-shaped, which is well-suited for rigidly mounting the base onto surfaces that may be contoured or bowed. Preferably, a gasket 20 is included between the mounting panel and the support surface. The gasket can be seen in FIGS. 3 and 7. Gasket 20 is formed from a closed cell foam type of material.

Also shown in FIG. 1 is a conventional lock cylinder 22 having a keyhole 24 which receives a key to rotate the lock cylinder between locked and unlocked positions. Since lock cylinder 22 is well-known, the operation of such will not be described in detail. This lock cylinder may have an internal construction similar to that of the key-plug 78 disclosed in the '976 patent, the external configuration of the inner end of lock cylinder 22 being modified as hereinafter described.

Figure 3:
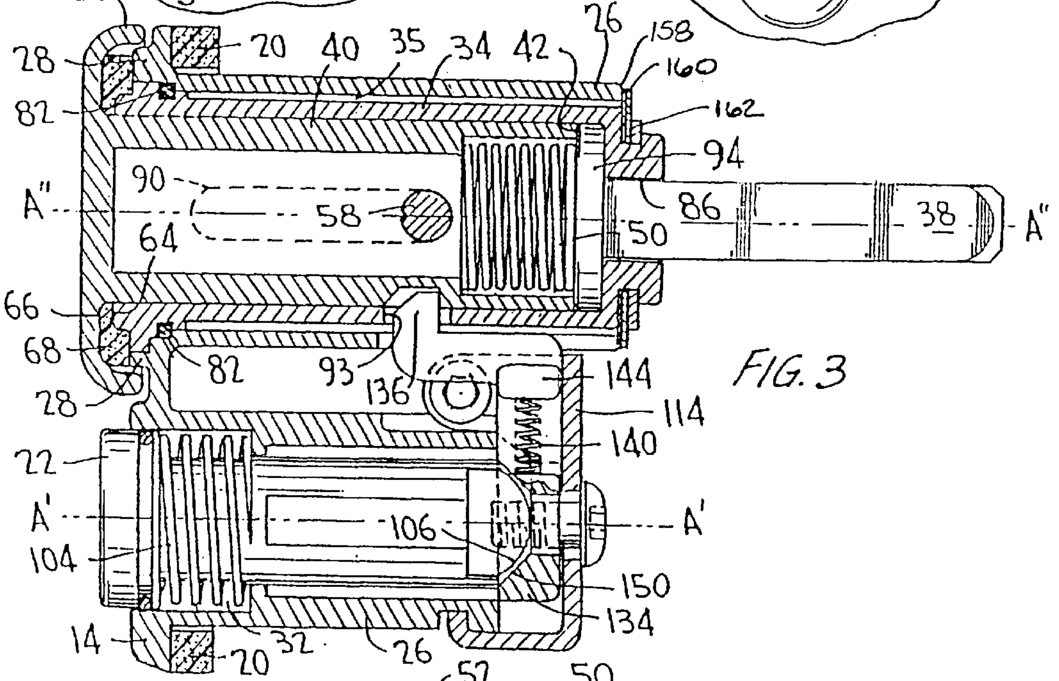
FIG. 3 is a longitudinal cross-sectional view taken generally along the line 3—3 in FIG. 1 with the pop-up handle assembly in locked position.
Figures 7, 8, 9, 10, 11:
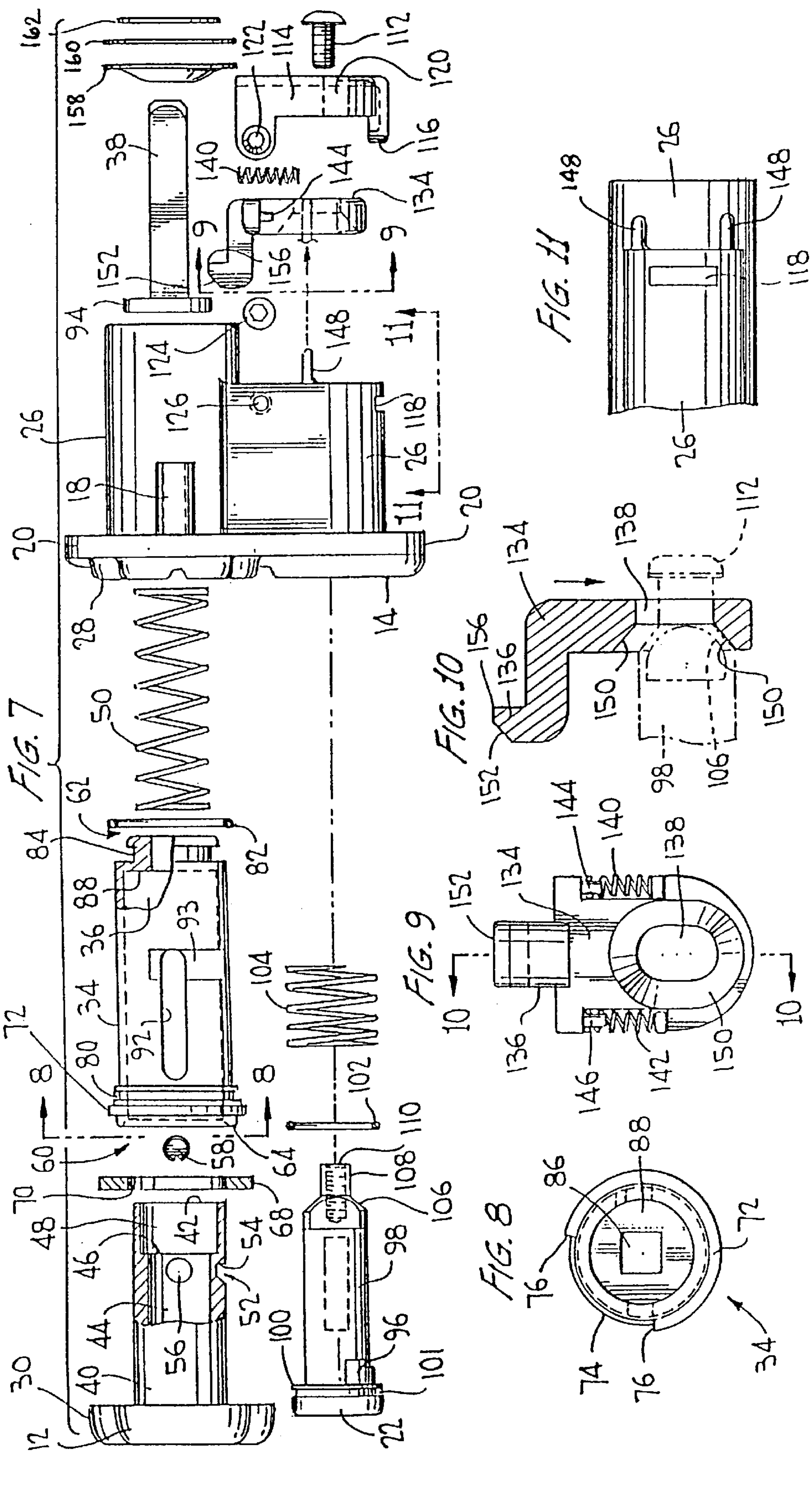
FIG. 7 is an exploded side view of the pop-up handle assembly of the present invention.
FIG. 8 is an end view of a sleeve taken along line 8—8 of FIG. 7.
FIG. 9 is an end view of a retainer taken along line 9—9 in FIG. 7.
FIG. 10 is a cross-sectional view of the retainer along line 10—10 of FIG. 9 showing the lock cylinder and a bolt in phantom lines.
FIG. 11 is a bottom view of a housing taken along line 11—11 of FIG. 7.

Referring to FIGS. 3 and 7, the assembly also includes a housing 26 which extends beyond the support surface 16 into an interior space. Housing 26 may be formed integral with mounting panel 14. Handle 12 and panel 14 include interengagable surfaces formed thereon for preventing rotation of the handle when in locked position. Although numerous embodiments are contemplated, a preferred embodiment includes a cooperating edge portion 28 being positioned along the periphery of mounting panel 14 as depicted in FIG. 2, and a contoured lip 30 extending along the periphery of handle 16 as shown in FIG. 3. In this embodiment, lip 30 coacts with the cooperating edge 28 to conceal both the mounting holes 18 as well as edge 28 when the handle is in the locked position as seen in FIGS. 1 and 3. More importantly, lip 30 may engage edge 28 to prevent handle rotation.

Figure 5:
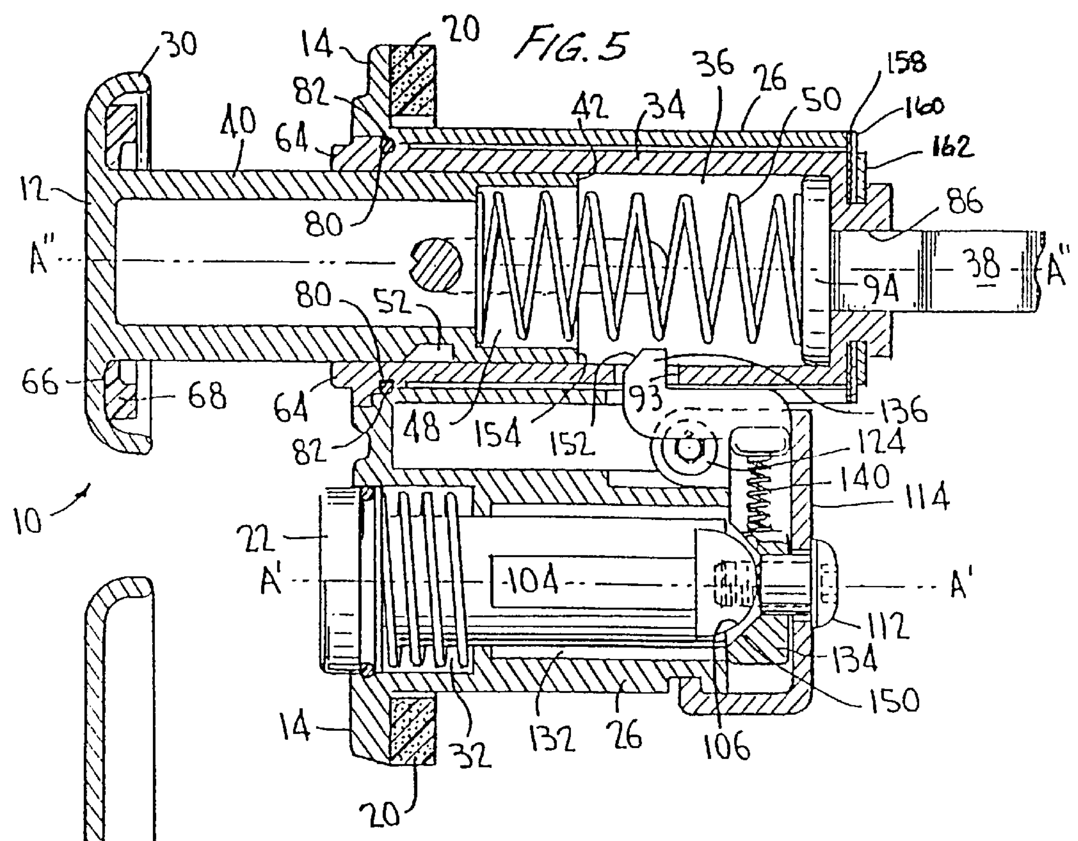
FIG. 5 is a view similar to FIG. 3 showing the pop-up handle assembly in open position.

Referring to FIGS. 3 and 5, housing 26 includes a stepped bore 32 defined longitudinally therethrough extending along a longitudinal axis A'—A'. Bore 32 carries the lock cylinder 22. Housing 26 also includes a sleeve 34 rotatably supported within a bore 35 formed in housing 26. Sleeve 34 includes a bore 36 defined therein extending along a longitudinal axis A"—A". Bore 36 can be seen in FIGS. 5 and 6, and carries handle 12 and accompanying components necessary to drivingly operate a shaft 38 from the handle. The details of these components are described below. As shown, bores 32 and 36 are laterally offset from one another and their respective longitudinal axes, A'—A' and A"—A" are in generally parallel relationship with one another.

Figure 4:
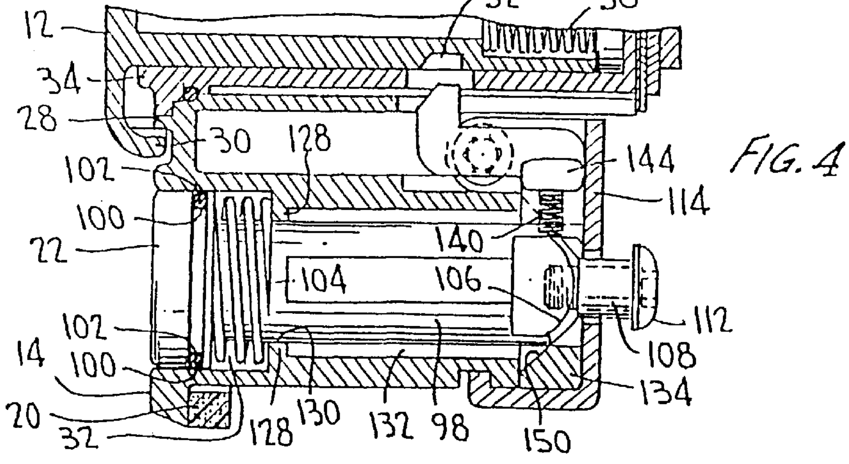
FIG. 4 is a view similar to FIG. 3 but broken away and showing the lock cylinder in depressed position in order to release the pop-up handle.

An explanation of the operation of handle assembly 10 will be discussed with detailed descriptions to follow. When lock cylinder 22 is locked, handle 12 is non-operable and resides in locked position as shown in FIGS. 1 and 3. When a key is used to rotate lock cylinder 22 to the unlocked position, cylinder 22 functions as a depressible push button as shown in FIG. 4. Depression of cylinder 22 releases the handle from the locked position so that it may move both longitudinally within and rotationally relative to bore 36. Longitudinal movement of the handle is provided between the locked position as shown in FIGS. 1 and 3 to a pop-up or open position as depicted in FIG. 5. When the handle is in the open position, it is operational and may rotate generally about 90 degrees to a position illustrated in FIGS. 2 and 6; the rotation of the handle in turn imparts rotation of shaft 38, which may be connected to open a latch which holds the support surface closed. Although not shown, various latching components residing adjacent to the support surface may be connected to shaft 38 so as to open and close the support surface. To return the handle back to the locked position, it must be rotated 90 degrees in the opposite direction and pushed back toward the mounting panel 14. Subsequently, cylinder 22 may be rotated to the locked position by use of the key.

Referring to FIGS. 3 and 7, handle 12 is formed integrally with a tubular portion 40 that terminates at an end 42. Portion 40 is slidably and rotatably disposed within bore 36. Portion 40 includes an internal bore 44 extending longitudinally thereof. Near end 42, the internal bore 44 is stepped so as to define a shoulder 46. At shoulder 46, portion 40 also includes a larger diameter bore 48 for receiving one end of a handle compression spring 50. When assembled, spring 50 is disposed within bores 36 and 48, and engages shoulder 46 to thereby normally urge the handle away from the mounting panel towards open position. Together, shoulder 46, bore 48 and spring 50 provide spring means biasing the handle towards open position. Portion 40 also includes a recess 52 disposed on the outer surface for receiving retaining means to be described later. Recess 52 includes a shoulder 54. The handle also includes two diametrically opposite openings 56 for receiving a groove pin 58 which extends outwardly of portion 40 on opposite sides thereof. Sleeve 34 is rotatably supported within the housing and is drivingly connected to portion 40 and shaft 38.

A handle gasket 68 is disposed between the underside portion 66 of the handle and a lip 64 formed on the outer end 60 of sleeve 34 so as to provide a seal therebetween when the handle is placed in locked position. Gasket 68 may be made from a plastic material and has a bore 70 therethrough. The diameter of bore 70 is generally equal to the outer diameter of portion 40. Gasket 68 is supported by portion 40 in engagement with underside portion 66, and is concealed under lip 30. Also near the outer end 60, the exterior of the sleeve 34 includes a flange 72. Referring to FIG. 8, flange 72 has about a 90 degree arcuate cut-away portion 74, which provides a pair of shoulders 76. The mounting panel has a projection (not shown) extending outwardly therefrom, the projection having opposite side surfaces defining a pair of stop shoulders when the projection extends into the cut-away portion 74 and the stop shoulders of the projection lie in the same plane as shoulders 76. As sleeve 34 rotates relative to the housing, shoulders 76 engage the stop shoulders when the sleeve rotates in opposite directions. Together, these components provide the means for limiting rotation of the handle. Also at the outer end 60, the sleeve 34 defines an outwardly facing annular groove 80, having a smaller outer diameter than flange 72. As shown in FIG. 5, an O-ring 82 is seated in groove 80 to provide a seal between this sleeve and the housing.

At the inner end 62 of the sleeve, the exterior surface is stepped twice so as to provide two smaller diameter outer portions which thereby defines an annular groove 84. Referring to FIG. 8, sleeve 34 is closed at the inner end, except for opening 86 defined through end wall 88. Opening 86 has a non-circular cross-sectional configuration which is square, the purpose of which will be described subsequently. Groove 84 is positioned circumferentially about opening 86.

Figure 6:
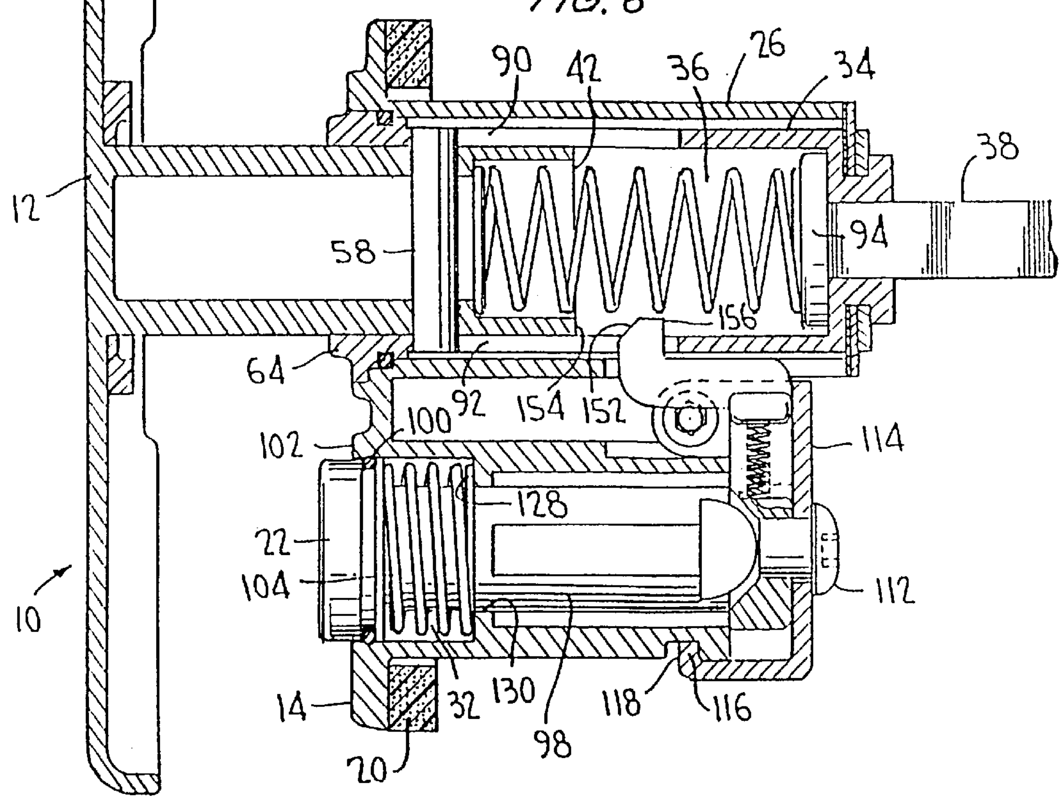
FIG. 6 is a view similar to FIG. 5 showing the pop-up handle assembly in open position with the handle rotated about 90 degrees from the position shown in FIG. 5.

Referring to FIG. 6, sleeve 34 also includes a pair of diametrically opposed longitudinally extending elongated slots 90 and 92 formed therein. Slot 92 joins with a further slot 93 which extends circumferentially of sleeve 34 through an arc of slightly more than 90 degrees, as shown in FIG. 7. Slots 90 and 92 receive groove pin 58, which enables relative longitudinal movement of the handle from locked to open positions while drivingly connecting the sleeve and portion 40 of the handle, thereby causing the sleeve to rotate with the handle. It is also noted that slot 93 shown in FIG. 7 is adapted to receive retaining means therethrough, as will be described subsequently. The shaft 38 includes a flat head portion 94. The shaft is inserted through opening 86 of the sleeve until flat head portion 94 abuts end wall 88. The cross-sectional areas of the shaft 38 and opening 86 are shaped to be non-circular and complementary to one another so that a rotational driving connection is formed therebetween. When assembled, spring 50 engages flat head 94 and shoulder 46 of the handle to urge them in opposite directions.

Returning to FIGS. 3 and 7, a spring washer 158 is secured in place by a retention washer 160, and a snap ring 162, all engagable therewithin groove 84.

To operate the lock cylinder 22, a key must first be inserted into keyhole 24 and cylinder 20 must be rotated 90 degrees to unlock it. At this 90 degree position, cylinder 22 functions as a push button and is movable longitudinally in bore 32. Member 22 cannot be operated in the locked position due to metal ribs 96 therewithin that prevent it from being depressed.

As seen in FIG. 7, lock cylinder 22 comprises a body 98, which includes an annularly defined groove 101, which receives an O-ring 102 to frictionally engage the interior of bore 32. A portion of cylinder 22 provides part of the operating means for operating and releasing the retaining means upon depression of the lock cylinder, as will be described in detail later. Upon depression of cylinder 22, the operating means release retaining means and permits the handle to move to open position under the influence of spring 50. This effectively causes the handle to pop-up into open position. In particular, cylinder 22 includes a cam portion having a cam surface 106 that moves longitudinally with cylinder 22. Cam surface 106 is centrally aligned with the longitudinal axis of body 98. This longitudinal axis coincides with axis A'—A'. A tip 108 is formed with a substantially smaller cross-sectional area than that of body 98 and has a threaded bore 110 therewithin for receiving a button head retaining screw 112.

A backplate 114 is includes a hook portion 116 received in a recess 118 defined in housing 26, as shown in FIG. 11. Cooperation of hook portion 116 with recess 118 serves as part of the alignment and locating means for properly orienting the backplate 114 with the housing 26 when assembled. A flat head screw, not shown, may be inserted through hole 122 defined in the backplate and through a washer 124, finally being received by a threaded bore 126 formed in housing 26. This configuration also helps to secure and align the backplate with the housing. Backplate 114 has a bore 120 formed therethrough for receiving screw 112.

As seen in FIG. 7, lock cylinder 22 has a flange 100 formed thereon which defines with the outer end of the lock cylinder the annular groove 101 which receives an O-ring 102. A compression spring 104 is disposed around the lock cylinder, with one end of the spring engaging flange 100 and the opposite end of the spring engaging shoulder 128 of bore 32 as seen in FIG. 4. An opening 130 is formed adjacent shoulder 128 and leads to a portion 132 of bore 32 having a smaller cross-sectional area. Opening 130 also has an even smaller cross-sectional area than that of bore 130 and supports body 98 of lock cylinder 22.

Referring to FIGS. 7 and 9, retaining means includes a retainer member 134 movable laterally of both bores 32 and 36, and perpendicular to axes A'—A' and A"—A". As shown in FIGS. 9 and 10, the retainer member includes an end portion 136 which moves into and out of engagement with the handle. Retainer member 134 has a bore 138 formed therethrough. When assembled, tip 108 is inserted through bores 138 and 120 and is held in place by screw 112 which is received by threaded bore 110 of the lock cylinder.

Referring to FIG. 9, two separate springs 140 and 142 are provided between shoulders on the retainer member and the housing. The pair of springs are disposed adjacent to side portions of the retainer member 134, one end of springs 140 and 142 being held in position by projections 144 and 146, respectively. The other end of springs 140 and 142 engage a pair of prongs 148 which are integral with housing 26 as seen in FIG. 11. Retainer member 134 also includes a frusto-conical cam surface 150 which cooperates with complementary cam surface 106 of cylinder 22 to move the retainer member into release position as shown in FIG. 4.

Referring to FIG. 3, springs 140 and 142 are expanded and urge end portion 136 through slot 93 to engage recess 52, thereby locking handle 12. When cylinder 22 is locked, it is not depressible and may not slide longitudinally to engage cam surface 106 with cam surface 150.

Referring to FIG. 4, upon depression of cylinder 22, cam surface 106 engages cam surface 150. This action causes springs 140 and 142 to compress, and retainer end portion 136 is retracted from engagement with recess 52. This allows handle 12 to be released or popped to the open position under the urging of spring 50.

Referring to FIG. 5, the handle is shown in the open position, having moved longitudinally from the locked position. Once the handle is released and raised, the push button function of cylinder 22 is released and retainer member 134 is allowed to be urged back by springs 140 and 142 to the position shown.

Referring to FIG. 6, once the key has been removed from lock cylinder 22, the handle is rotated 90 degrees clockwise. This rotational movement thereby drivingly rotates sleeve 34 and shaft 38. The shaft may operate a latch, rod or cam mechanism to unlock the type of support surfaces previously mentioned.

To move the handle back to the locked position from the open position, the handle must be rotated 90 degrees counter-clockwise from the position shown in FIG. 6 to the position shown in FIG. 5. End portion 136 of the retainer member has a cam surface 152 thereon. When the handle 12 is pushed towards mounting panel 14, the inner end 154 of handle portion 40 engages cam surface 152. This forces the retainer member 134 away from longitudinal axis A"—A" so that tubular body 40 may slide over end portion 136. Once recess 52 is aligned with slot 93, end portion 136 is moved into recess 52 by the two springs 140 and 142. The cooperation between corner 156 on end portion 136 and shoulder 54 in recess 52 prevents spring 50 from urging handle 12 away from the mounting panel.

The push button function can then be disabled by re-inserting the key into keyhole 24 and turning the key counter-clockwise 90 degrees, thereby locking the lock cylinder in position.

Although particular embodiments of the invention have been described in detail herein with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A pop-up handle assembly comprising:

a mounting panel for attachment to a support, a housing supported by said mounting panel, means defining a first bore within said housing, said first bore having a first longitudinal axis, said housing having a second bore therein offset laterally of said first bore and having a second longitudinal axis disposed in generally parallel relationship to said first bore, a pop-up handle including a portion disposed within said first bore and movable between locked and open positions, said handle being rotatably and longitudinally movable within said first bore, means preventing rotation of said handle when in locked position, a shaft, said handle being drivingly connected to said shaft, a lock cylinder longitudinally movable in said second bore, retaining means for retaining said handle in locked position, and operating means for releasing said retaining means when said lock cylinder moves longitudinally within said second bore thereby allowing movement of said handle to its open position.

2. An assembly as defined in claim 1, wherein said means for preventing rotation of said handle when in locked position comprises interengagable surfaces formed on said handle and on said mounting panel.

3. An assembly as defined in claim 1, including a sleeve rotatably supported within said first bore, said sleeve being drivingly connected to said shaft, said sleeve also being drivingly connected to said handle so that the sleeve rotates with the handle while permitting relative longitudinal movement between the handle and the sleeve.

4. An assembly as defined in claim 1, wherein said retaining means comprises a retainer member movable laterally of said first longitudinal axis to move into and out of engagement with said handle.

5. An assembly as defined in claim 4, including spring means for urging said retainer member towards said first longitudinal axis.

6. An assembly as defined in claim 5, wherein said operating means includes a cam portion having a first cam surface thereon, said cam portion being movable with said lock cylinder, said retainer member having a second cam surface thereon which cooperates with said first cam surface to move said retainer member into release position.

7. An assembly as defined in claim 1, including a spring normally urging said handle toward open position.

8. A pop-up handle assembly comprising:

mounting panel for attachment to a support, a housing supported by said mounting panel, a sleeve rotatably supported within said housing and having a first bore therein, a shaft drivingly connected to said sleeve, a pop-up handle movable between locked and open positions, said handle and said mounting panel having interengageable portions which in locked position prevent rotation of said handle, said handle including a further portion slidably and rotatably disposed within said first bore, spring means biasing said handle toward open position, means drivingly connecting said sleeve and said further portion of said handle while permitting relative longitudinal movement therebetween, a second bore disposed within said housing and being generally parallel to said first bore, a depressible lock cylinder slidably and rotatably disposed within said second bore, retaining means for retaining the handle in locked position and preventing said spring from urging said handle toward open position, and operating means for operating said retaining means upon depression of the lock cylinder for releasing said retaining means and permitting said handle to move to open position under the influence of said spring to cause the handle to pop up into open position.

9. An assembly as defined in claim 8, wherein said sleeve has an opening formed therethrough through which said retaining means extends.

10. An assembly as defined in claim 9, wherein said further portion of the handle has a recess therein for receiving said retaining means.

11. An assembly as defined in claim 8, wherein said interengageable portions include a lip formed along the periphery said handle and a cooperating edge portion formed on said panel.

12. An assembly as defined in claim 8, wherein said spring means is disposed within said first bore and engages said further portion of the handle.

13. An assembly as defined in claim 8, wherein said means drivingly connecting said sleeve and the further portion of the handle comprises slot means formed in said sleeve, said slot means receiving a pin rotatably fixed to said further portion of the handle.

14. An assembly as defined in claim 8, wherein said retaining means comprises a retainer member movable laterally of said first bore for movement into and out of engagement with said further portion of the handle, and biasing means for biasing said retainer member into engagement with said further portion of the handle.

15. An assembly as defined in claim 14, wherein said biasing means comprises further spring means disposed between said retainer member and said housing.

16. An assembly as defined in claim 15, wherein said further spring means comprises a pair of separate springs, said retainer member having opposite side portions, each of said springs being disposed adjacent one of said side portions.

17. An assembly as defined in claim 14, wherein said operating means includes a first cam surface movable with said lock cylinder, said retainer member having a second cam surface formed thereon for engaging said first cam surface so that longitudinal movement of said lock cylinder in said second bore causes said retainer member to be moved out of engagement with said further portion of the handle.

18. An assembly as defined in claim 14, wherein said retainer member includes an end portion which moves into and out of engagement with said further portion of the handle, said handle having an inner end, said end portion of the retainer member having a cam surface formed thereon for engaging the inner end of the handle for moving said retainer member away from a longitudinal axis to permit movement of the handle from its open position to its locked position.

* * * * *